US008566108B2

(12) United States Patent  
Ojala et al.

(10) Patent No.: US 8,566,108 B2  
(45) Date of Patent: Oct. 22, 2013

(54) SYNCHRONIZATION OF MULTIPLE REAL-TIME TRANSPORT PROTOCOL SESSIONS

(75) Inventors: Pasi Ojala, Kirkkonummi (FI); Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 12/746,076

(22) PCT Filed: Dec. 3, 2007

(86) PCT No.: PCT/EP2007/063202  
§ 371 (c)(1),  
(2), (4) Date: Jul. 21, 2010

(87) PCT Pub. No.: WO2009/071115  
PCT Pub. Date: Jun. 11, 2009

(65) Prior Publication Data  
US 2010/0280832 A1    Nov. 4, 2010

(51) Int. Cl.  
*G10L 19/00* (2013.01)  
*G10L 21/04* (2013.01)  
*H04B 1/66* (2006.01)

(52) U.S. Cl.  
USPC ........... 704/500; 704/501; 704/502; 704/503; 704/504; 375/240; 375/240.1; 370/310

(58) Field of Classification Search  
USPC ......... 704/500–504; 375/240, 240.1; 370/310  
See application file for complete search history.

(56) References Cited

U.S. PATENT DOCUMENTS

| | | | |
|---|---|---|---|
| 6,510,553 B1* | 1/2003 | Hazra | 725/87 |
| 7,133,449 B2* | 11/2006 | Chen | 375/240.1 |
| 7,221,660 B1* | 5/2007 | Simonson et al. | 370/312 |
| 7,573,912 B2* | 8/2009 | Lindblom | 370/487 |
| 2002/0191625 A1* | 12/2002 | Kelly et al. | 370/412 |
| 2005/0036557 A1 | 2/2005 | Balakrishnan et al. | |
| 2005/0058150 A1* | 3/2005 | Boles et al. | 370/445 |
| 2005/0094628 A1* | 5/2005 | Ngamwongwattana et al. | 370/352 |
| 2006/0039480 A1* | 2/2006 | Seo | 375/240.24 |
| 2006/0098937 A1* | 5/2006 | Bruls et al. | 386/46 |
| 2006/0133358 A1* | 6/2006 | Li et al. | 370/352 |
| 2006/0164987 A1* | 7/2006 | Ruiz Floriach et al. | 370/235 |

(Continued)

FOREIGN PATENT DOCUMENTS

| | | | |
|---|---|---|---|
| EP | 0624983 A | 11/1994 | |
| EP | 1773072 A | 4/2007 | |
| WO | 2006102991 A | 10/2006 | |

OTHER PUBLICATIONS

International Search Report and Written Opinion of the International Searching Authority of PCT/EP2007/063202 dated Oct. 21, 2008, pp. 1-14.

(Continued)

*Primary Examiner* — Paras D Shah  
(74) *Attorney, Agent, or Firm* — Mintz, Levin, Cohn, Ferris, Glovsky & Popeo, P.C.

(57) ABSTRACT

A packet generator for generating packets from an input signal configured to: generate at least one first signal, dependent on the input signal, the first signal comprising a first relative time value; generate at least one second signal, dependent on the input signal and associated with the at least one first signal; and generate at least one indicator associated with each of the at least one second signal, each indicator dependent on the first relative time value.

30 Claims, 6 Drawing Sheets

(56) References Cited

U.S. PATENT DOCUMENTS

2007/0002902 A1    1/2007   Hannuksela
2007/0081588 A1*   4/2007   Raveendran et al. ...... 375/240.1
2007/0291836 A1*  12/2007   Shi et al. .................. 375/240.01
2008/0013614 A1    1/2008   Fiesel et al.

OTHER PUBLICATIONS

Lakaniemi, "RTP Payload Format for the ITU-T Embedded Variable Bit-Rate Speech/Audio Codec; draft-lakaniemi-avt-rtp-evbr-00.txt" IETF Standard Working Draft, Internet Engineering Task Force, IETF, CH, Nov. 12, 2007.

Lakaniemi et al., "RTP Payload Format for G.718 speech/audio; draft-lakaniemi-avt-rtp-ev br-02.txt" IETF Standard-Working-Draft, Internet Engineering Task Force, IETF, CH, No. 2, Jul. 14, 2008.

Lakaniemi, "EV-VBR RTP payload format proposal overview", Nokia, Dec. 3, 2007.

* cited by examiner

SYNCHRONIZATION OF MULTIPLE REAL-TIME TRANSPORT PROTOCOL SESSIONS

RELATED APPLICATION

This application was originally filed as PCT Application No. PCT/EP2007/063202 filed Dec. 3, 2007.

FIELD OF THE INVENTION

The present invention relates to media transport, and in particular, but not exclusively to transport of encoded speech, audio or video signal.

BACKGROUND OF THE INVENTION

Audio signals, like speech or music, are encoded for example for enabling an efficient transmission or storage of the audio signals.

Audio encoders and decoders are used to represent audio based signals, such as music and background noise. These types of coders typically do not utilise a speech model for the coding process, rather they use processes for representing all types of audio signals, including speech.

Speech encoders and decoders (codecs) are usually optimised for speech signals, and can operate at either a fixed or variable bit rate.

An audio codec can also be configured to operate with varying bit rates. At lower bit rates, such an audio codec may work with speech signals at a coding rate equivalent to a pure speech codec. At higher bit rates, the audio codec may code any signal including music, background noise and speech, with higher quality and performance.

In some audio codecs the input signal is divided into a limited number of bands. Each of the band signals may be quantized. From the theory of psychoacoustics it is known that the highest frequencies in the spectrum are perceptually less important than the low frequencies. This in some audio codecs is reflected by a bit allocation where fewer bits are allocated to high frequency signals than low frequency signals.

One emerging trend in the field of media coding are so-called layered codecs, for example ITU-T Embedded Variable Bit-Rate (EV-VBR) speech/audio codec and ITU-T Scalable Video Codec (SVC). The scalable media data consists of a core layer, which is always needed to enable reconstruction in the receiving end, and one or several enhancement layers that can be used to provide added value to the reconstructed media (e.g. improved media quality or increased robustness against transmission errors, etc).

The scalability of these codecs may be used in a transmission level e.g. for controlling the network capacity or shaping a multicast media stream to facilitate operation with participants behind access links of different bandwidth. In an application level the scalability may be used for controlling such variables as computational complexity, encoding delay, or desired quality level. Note that whilst in some scenarios the scalability can be applied at the transmitting end point, there are also operating scenarios where it is more suitable that an intermediate network element is able to perform the scaling.

For example this scalable layer operation to audio encoding may be employed in telephony. For example in packet switched network transmission protocols typically employed for Voice over IP (VoIP) the audio signal is layer encoded using packets transmitted according to the Real-time Transport Protocol (RTP) encapsulated in the User Datagram Protocol (UDP), further encapsulated in Internet Protocol (IP).

In such media transport arrangements scalable codecs can be handled in one of two ways. In the first arrangement the enhancement layers may be transmitted in the same packets, i.e. in the same RTP session as the core layer data.

The approach of carrying all of the layers (of a media frame) in a single packet provides low overhead and easy cross-layer synchronization as the receiver decoder knows that all information for a certain media frame is carried in the same packet, which implicitly also provides cross-layer media synchronization. However, the drawback of this approach is that any intermediate network element carrying out a scaling operation needs to be aware of the details of the packet and media content structure, and then carry out a filtering operation by reading, parsing, and then modifying the packet contents.

The second approach is that the enhancement layers (or the subsets of enhancement layers) may be transmitted in separate packet stream(s) as the core layer data. This second approach requires also a signalling mechanism that can be used to synchronize the separate packet data streams carrying layers of the same media source.

However the second approach, employing separate data streams for (subsets of) layers, provides easier scaling opportunities because the scaling operations can be realized by discarding packets of some data streams and therefore not requiring the packet to be modified.

This approach therefore does not require in-depth knowledge about the packet structure but the scaling operations can be performed based on information about the relationship between the data streams.

Multiple data streams using multiple RTP sessions is the traditional way to transmit layered media data within a RTP framework (the approach is often referred to as scalable multicast).

Synchronization of multiple data streams is obviously a problem when the receiver is reconstructing a media frame using layers distributed across multiple RTP sessions.

The timeline of a media stream received in RTP packets can be reconstructed using Time Stamp (TS) information included in the RTP header. The RTP TS provides information on the temporal difference compared to other RTP packets transmitted in the same RTP session, which enables putting each received media frame in its correct place in the timeline.

However, the initial value of the RTP TS of an RTP session is a random value. Thus the RTP TS does NOT indicate an absolute time (i.e. "wallclock time") but only a relative time or timing reference within the RTP session. Note that this "randomness" may be considered to be an unknown offset from an absolute time. The unknown offset may and is likely to be different in each RTP session.

Thus two or more RTP sessions cannot be synchronized based on their RTP TS values only and is valid for separate RTP sessions used to carry (subsets of) layers of layered encoding.

The prior-art mechanism for synchronizing multiple RTP sessions is to use the control protocol associated with the transport protocol to send additional information. Thus in the prior art Real-Time Control Protocol (RTCP) reports may be transmitted within each session. The transmitter of these RTCP reports includes both a timing reference (NTP) and a sending instant in the RTP TS domain in the RTCP Sender Reports (SR) transmitted according to a specified pattern.

Furthermore, an RTCP packet also includes an identifier (SSRC) that is used to map an RTCP packet to the correct stream of RTP packets.

The receiver on receiving the control protocol packets may use these control protocol packets within the timing reference and the RTP time stamps to compute the RTP TS offset from the timing reference (NTP) for each of the RTP sessions it receives. These offsets values may then be used to match the timing of the media data received in separate RTP sessions. Therefore, for example, the receiver may combine layers of a media frame received in multiple RTP sessions.

However a problem associated with such a system is that it requires a RTCP SRs for each of the RTP sessions to be received before any full reconstruction of a media frame can be carried out. In case of layered media in practice this means that only the core layer of any layered encoding scheme is available until the synchronization information is available, i.e. until the first RTCP packets (on each of the sessions) are received.

A less complex approach, not relying on the control protocol associated with the transport protocol, has been to pre-synchronize the RTP TS across RTP sessions in the transmitting end-point. In other words the "random" initial value of the RTP TS is set to be the same value for each RTP session.

Whilst this may provide simple cross-session synchronization mechanism without need to transmit additional data, it is not in line with the RTP specification, and existing RTP implementations may therefore not support it.

Furthermore such an approach would provide synchronization at the RTP (header) level, but only for the subset of RTP payloads which were pre-synchronized. Such payload type-dependent processing at RTP level may be considered a non-desirable feature in a system handling multiple payload types.

A further prior-art solution has been to attach additional information for each transmitted data unit (e.g. a layer of a media frame in a layered encoding transport) indicating its temporal location in the presentation timeline. Such additional information may be for example a cross-layer sequence number or an additional timestamp information value that can be used at the receiver/intermediate network element to reconstruct the presentation order of media frames and layers within the frames.

This additional information adds additional overhead for each packet and although it may be possible to use information with data fields smaller than a RTP Sequence Number (SN) and RTP TS (16 bits and 32 bits, respectively), any information added to each packet would still introduce additional overhead for each transmitted layer. For example in the case of smallish pieces of speech/audio data (in order of 10-20 bytes) even one additional byte of overhead per layer may have a significant effect on the overall system performance.

SUMMARY OF THE INVENTION

This application proposes a mechanism that facilitates efficient cross-layer synchronization with minimal overhead where multiple RTP sessions are used.

Embodiments of the present invention aim to address the above problem.

There is provided according to a first aspect of the present invention a packet generator for generating packets from an input signal configured to: generate at least one first signal, dependent on the input signal, the first signal comprising a first relative time value; generate at least one second signal, dependent on the input signal and associated with the at least one first signal; generate at least one indicator associated with each of the at least one second signal, each indicator dependent on the first relative time value.

The first signal may comprise a core layer encoded signal.

Each of the at least one second signal may comprise an enhancement layer.

The indicator may comprise an identifier identifying the corresponding first signal.

The first relative time value may comprise a real-time transport protocol time stamp and wherein the identifier may comprise the real-time transport protocol time stamp of the first encoded signal.

Each second signal may comprise an associated second relative time value.

The indicator may comprise the difference between the first relative time value and the associated second relative time value.

The first signal may further comprise a sequence number; and wherein the each indicator may comprise the sequence number value.

The first signal may further comprise a first identifier value dependent on the first relative time value.

Each indicator may comprise the first identifier value.

Each indicator may comprise at least one second identifier value, the second identifier value being preferably dependent on the first identifier value and the at least one second signal.

The packet generator for generating packets from the input signal may further be configured to determine if a synchronization point has been reached.

The packet generator is preferably configured to generate the indicator only if a synchronization point has been reached.

The synchronization point is preferably determined dependent on receiving a synchronization request.

The at least a first signal may comprise a plurality of packets and wherein the synchronization point is preferably determined dependent on detecting any of a predetermined number of packets, wherein the predetermined number of packets may comprise at least one of: the first predetermined number of packets of the plurality of packets; at least one of the predetermined number of packets separated from a second of the predetermined number of packets by a second predetermined number of packets; at least one of the predetermined number of packets separated from a second of the predetermined number of packets by a predetermined time period.

The at least a first signal may comprise a plurality of packets and wherein the synchronization point is preferably determined dependent on detecting a discontinuity in the stream of packets.

The at least a first signal may comprise a plurality of packets and wherein the synchronization point is preferably determined dependent on detecting the changing of the configuration of at least one of the first and second signals.

The at least a first signal may comprise a plurality of packets and wherein the synchronization point is preferably determined dependent on detecting a talk spurt or a restarting of a session.

The first signal may comprise at least one of: an algebraic code excited linear prediction signal; a variable rate multi-rate encoded signal; and ITU-T G729 core layer signal.

The packet generator is preferably further configured to encode the input stream to generate the first signal and the second signal.

The input stream preferably comprises at least one of: audio data; video data; MIDI data; animated graphics data; and text data.

According to a second aspect of the invention there is provided a packet synchronizer for synchronizing an encoded signal, configured to: receive an encoded signal comprising at least one first encoded signal, comprising a first relative time value, at least one second encoded signal comprising a second relative time value, and at least one indicator associated with each of the at least one second encoded signal; synchronize each of the at least one second encoded signal with at least one of at least one first encoded signal dependent on the associated at least one indicator first relative time value.

The packet synchronizer for synchronizing an encoded signal may further be configured to decode each of the at least one second encoded signal synchronized with the at least one of the first encoded signals to generate a decoded signal.

The at least one first encoded signal may comprise at least one core layer audio encoded signal, and the at least one second encoded signal may comprise at least one enhancement layer audio encoded signal.

The indicator may comprise an identifier identifying one of the at least one first encoded signal.

Each first relative time value may comprise a first time stamp value, and the indicator may comprise the first time stamp value for one of the first encoded signals associated with one of the second encoded signals.

Each second relative time value may comprise a second time stamp value and the decoder is preferably further configured to determine a time offset value between the first time stamp value and the second time stamp value of the associated one of the second encoded signals.

The indicator may comprise the difference between the first relative time value and the associated second relative time value.

The first encoded signal may further comprise a sequence number; and wherein the each indicator may comprise the sequence number value of the associated first encoded signal.

The first encoded signal may further comprise a first identifier value dependent on the first relative time value.

Each indicator may comprise the first identifier value.

Each indicator may comprise at least one second identifier value, the second identifier value may be dependent on the first identifier value and the at least one second encoded signal.

According to a third aspect of the invention there is provided a method for generating packets from an input signal comprising: generating at least one first signal, dependent on the input signal, the first signal comprising a first relative time value; generating at least one second signal, dependent on the input signal and associated with the at least one first signal; generating at least one indicator associated with each of the at least one second signal, each indicator dependent on the first relative time value.

The first signal may comprise a core layer encoded signal.

Each of the at least one second signal may comprise an enhancement layer.

The indicator may comprise an identifier identifying the corresponding first signal.

The first relative time value may comprise a real-time transport protocol time stamp and wherein the identifier comprises the real-time transport protocol time stamp of the first encoded signal.

Each second signal may comprise an associated second relative time value.

The indicator may comprise the difference between the first relative time value and the associated second relative time value.

The first signal may further comprise a sequence number; and wherein the each indicator comprises the sequence number value.

The first signal may further comprise a first identifier value dependent on the first relative time value.

Each indicator may comprise the first identifier value.

Each indicator may comprise at least one second identifier value, the second identifier value may be dependent on the first identifier value and the at least one second signal.

The method for generating packets from the input signal may further comprise: determining if a synchronization point has been reached.

The method for generating packets from the input signal may further comprise generating the indicator only if a synchronization point has been reached.

The synchronization point is preferably determined dependent on receiving a synchronization request.

The at least a first signal preferably comprises a plurality of packets and wherein the synchronization point is preferably determined dependent on detecting any of a predetermined number of packets, wherein the predetermined number of packets may comprise at least one of: the first predetermined number of packets of the plurality of packets; at least one of the predetermined number of packets separated from a second of the predetermined number of packets by a second predetermined number of packets; at least one of the predetermined number of packets separated from a second of the predetermined number of packets by a predetermined time period.

The at least a first signal may comprise a plurality of packets and wherein the synchronization point is preferably determined dependent on detecting a discontinuity in the stream of packets.

The at least a first signal may comprise a plurality of packets and wherein the synchronization point is preferably determined dependent on detecting the changing of the configuration of at least one of the first and second signals.

The at least a first signal may comprise a plurality of packets and wherein the synchronization point is preferably determined dependent on detecting a talk spurt or a restarting of a session.

The first signal may comprise at least one of: an algebraic code excited linear prediction signal; a variable rate multirate encoded signal; and ITU-T G729 core layer signal.

The method may further comprise encoding the input stream to generate the first signal and the second signal.

The input stream may further comprise at least one of: audio data; video data; MIDI data; animated graphics data; and text data.

According to a fourth aspect of the present invention there is provided a method for synchronizing an encoded signal, comprising: receiving an encoded signal comprising at least one first encoded signal, comprising a first relative time value, at least one second encoded signal comprising a second relative time value, and at least one indicator associated with each of the at least one second encoded signal; and synchronizing each of the at least one second encoded signal with at least one of at least one first encoded signal dependent on the associated at least one indicator first relative time value.

The method for synchronizing an encoded signal may further comprise decoding each of the at least one second encoded signal synchronized with the at least one of the first encoded signals to generate a decoded signal.

The at least one first encoded signal may comprises at least one core layer encoded signal, and the at least one second encoded signal may comprise at least one enhancement layer encoded signal.

The indicator may comprise an identifier identifying one of the at least one first encoded signal.

Each first relative time value may comprise a first time stamp value, and the indicator may comprise the first time stamp value for one of the first encoded signals associated with one of the second encoded signals.

Each second relative time value may comprise a second time stamp value and the method may further comprises determining a time offset value between the first time stamp value and the second time stamp value of the associated one of the second encoded signals.

The indicator may comprise the difference between the first relative time value and the associated second relative time value.

The first encoded signal may further comprise a sequence number; and wherein the each indicator comprises the sequence number value of the associated first encoded signal.

The first encoded signal may further comprise a first identifier value dependent on the first relative time value.

Each indicator may comprise the first identifier value.

Each indicator may comprise at least one second identifier value, the second identifier value may be dependent on the first identifier value and the at least one second encoded signal.

An apparatus may comprise an encoder as featured above.

An apparatus may comprise a decoder as featured above.

An electronic device may comprise an encoder as featured above.

An electronic device may comprise a decoder as featured above.

A chipset may comprise an encoder as featured above.

A chipset may comprise a decoder as featured above.

According to a fifth aspect of the present invention there is provided a computer program product configured to perform a method for generating packets from an input signal comprising: generating at least one first signal, dependent on the input signal, the first signal comprising a first relative time value; generating at least one second signal, dependent on the input signal and associated with the at least one first signal; generating at least one indicator associated with each of the at least one second signal, each indicator dependent on the first relative time value.

According to a sixth aspect of the present invention there is provided a computer program product configured to perform a method for synchronizing an encoded signal, comprising: receiving an encoded signal comprising at least one first encoded signal, comprising a first relative time value, at least one second encoded signal comprising a second relative time value, and at least one indicator associated with each of the at least one second encoded signal; and synchronizing each of the at least one second encoded signal with at least one of at least one first encoded signal dependent on the associated at least one indicator first relative time value.

According to a seventh aspect of the present invention there is provided a packet generator for generating packets from an input signal comprising: first processing means for generating at least one first signal, dependent on the input signal, the first signal comprising a first relative time value; second processing means for generating at least one second signal, dependent on the input signal and associated with the at least one first signal; and third processing means for generating at least one indicator associated with each of the at least one second signal, each indicator dependent on the first relative time value.

According to an eighth aspect of the present invention there is provided a packet synchronizer for synchronizing packets comprising: receiving means for receiving an encoded signal comprising at least one first encoded signal, comprising a first relative time value, at least one second encoded signal comprising a second relative time value, and at least one indicator associated with each of the at least one second encoded signal; signal processing means for synchronizing each of the at least one second encoded signal with at least one of at least one first encoded signal dependent on the associated at least one indicator first relative time value.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Whilst the below examples and embodiments are described with respect to the audio encoding and decoding using RTP sessions it would be possible for the person skilled in the art to apply the same or similar operations to synchronize RTP sessions carrying media streams with other types of relationships than layered coding. For example the same approach may be applied to a set of media streams constituting the data for multi descriptive coding. Furthermore, the mechanism described below may also apply to any different types of media components transmitted in separate RTP sessions, for example audio and video coding.

The following describes in more detail possible mechanisms for the provision of a scalable audio coding system. In this regard reference is first made to FIG. 1 which shows a schematic block diagram of an exemplary electronic device 10, which may incorporate a codec according to an embodiment of the invention.

Figure 1:
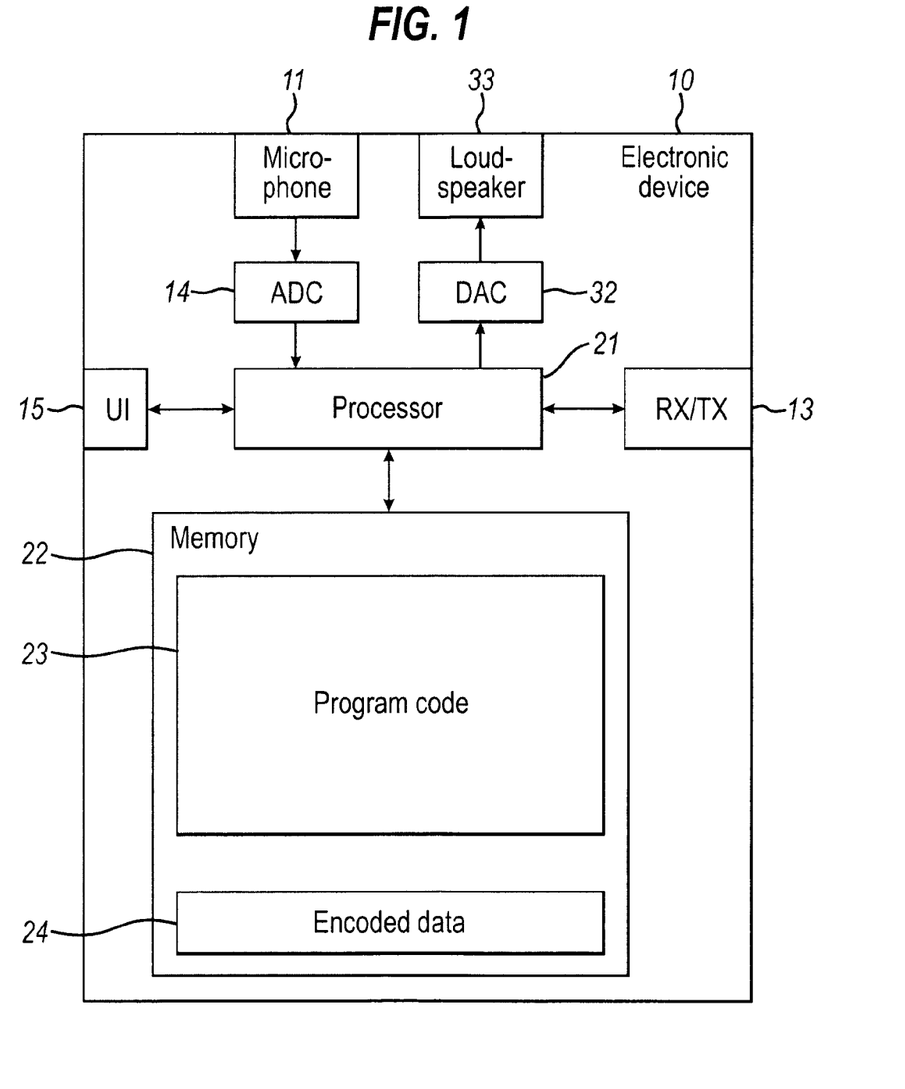
FIG. 1 shows schematically an electronic device employing embodiments of the invention.

The electronic device 10 may for example be a mobile terminal or user equipment of a wireless communication system.

The electronic device 10 comprises a microphone 11, which is linked via an analogue-to-digital converter 14 to a processor 21. The processor 21 is further linked via a digital-to-analogue converter 32 to loudspeakers 33. The processor 21 is further linked to a transceiver (TX/RX) 13, to a user interface (UI) 15 and to a memory 22.

The processor 21 may be configured to execute various program codes. The implemented program codes comprise an audio encoding code for encoding a combined audio signal and code to extract and encode side information pertaining to the spatial information of the multiple channels. The implemented program codes 23 further comprise an audio decoding code. The implemented program codes 23 may be stored for example in the memory 22 for retrieval by the processor 21 whenever needed. The memory 22 could further provide a section 24 for storing data, for example data that has been encoded in accordance with the invention.

The encoding and decoding code may in embodiments of the invention be implemented in hardware or firmware.

The user interface 15 enables a user to input commands to the electronic device 10, for example via a keypad, and/or to obtain information from the electronic device 10, for example via a display. The transceiver 13 enables a communication with other electronic devices, for example via a wireless communication network.

It is to be understood again that the structure of the electronic device 10 could be supplemented and varied in many ways.

A user of the electronic device 10 may use the microphone 11 for inputting speech that is to be transmitted to some other electronic device or that is to be stored in the data section 24 of the memory 22. A corresponding application has been activated to this end by the user via the user interface 15. This application, which may be run by the processor 21, causes the processor 21 to execute the encoding code stored in the memory 22.

The analogue-to-digital converter 14 converts the input analogue audio signal into a digital audio signal and provides the digital audio signal to the processor 21.

The processor 21 may then process the digital audio signal in the same way as described with reference to FIGS. 2 and 3.

The resulting bit stream is provided to the transceiver 13 for transmission to another electronic device. Alternatively, the coded data could be stored in the data section 24 of the memory 22, for instance for a later transmission or for a later presentation by the same electronic device 10.

The electronic device 10 could also receive a bit stream with correspondingly encoded data from another electronic device via its transceiver 13. In this case, the processor 21 may execute the decoding program code stored in the memory 22. The processor 21 decodes the received data, and provides the decoded data to the digital-to-analogue converter 32. The digital-to-analogue converter 32 converts the digital decoded data into analogue audio data and outputs them via the loudspeakers 33. Execution of the decoding program code could be triggered as well by an application that has been called by the user via the user interface 15.

The received encoded data could also be stored instead of an immediate presentation via the loudspeaker(s) 33 in the data section 24 of the memory 22, for instance for enabling a later presentation or a forwarding to still another electronic device.

Figure 2:
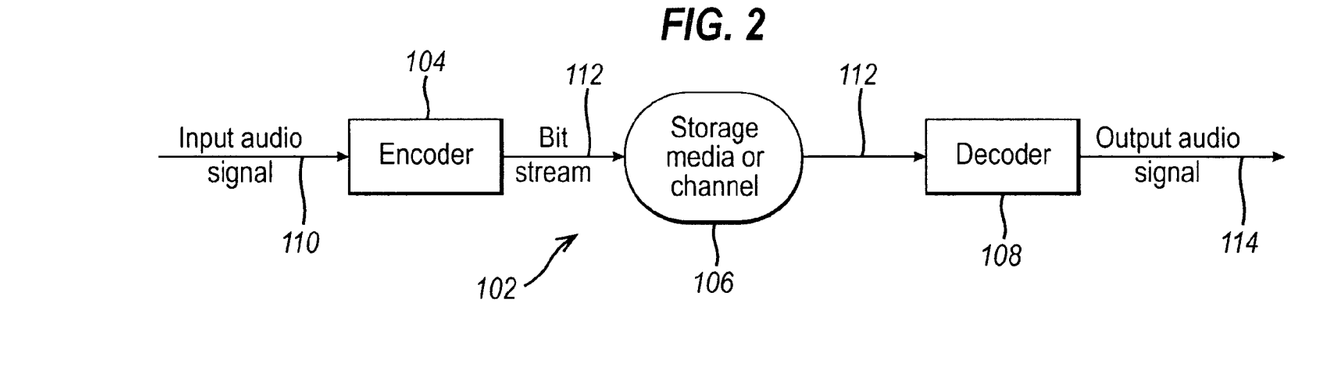
FIG. 2 shows schematically an audio codec system employing embodiments of the present invention.
Figure 3:
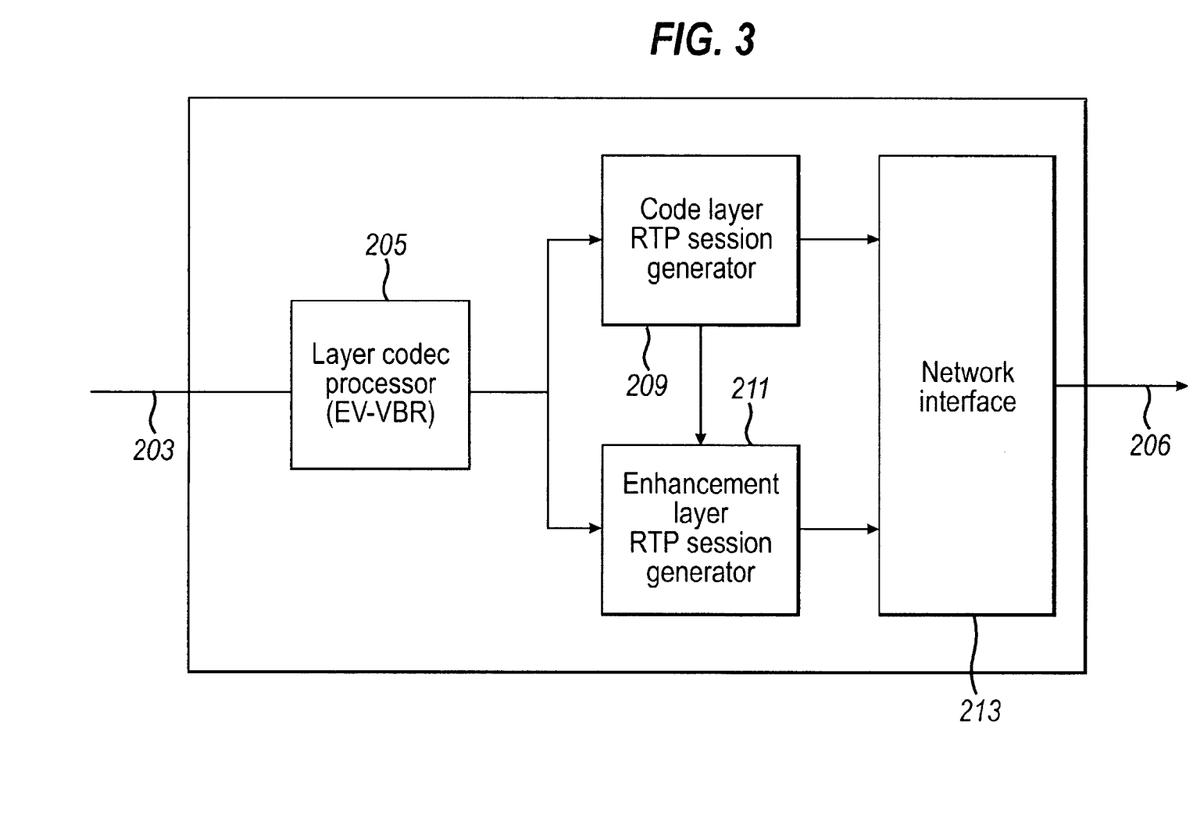
FIG. 3 shows schematically an encoder part of the audio codec system shown in FIG. 2.
Figure 4:
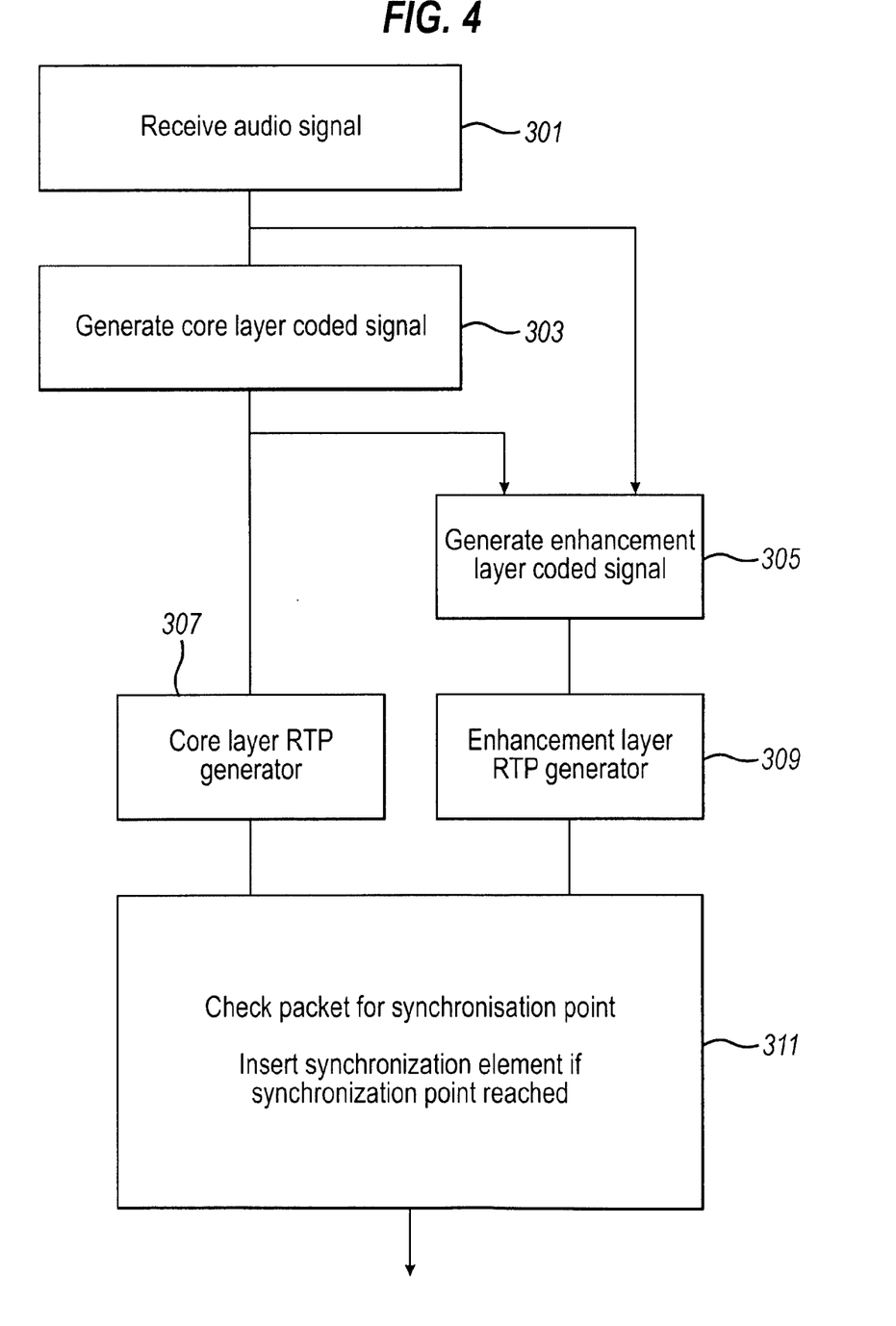
FIG. 4 shows schematically a flow diagram illustrating the operation of an embodiment of the audio encoder as shown in FIG. 3 according to the present invention.
Figure 5:
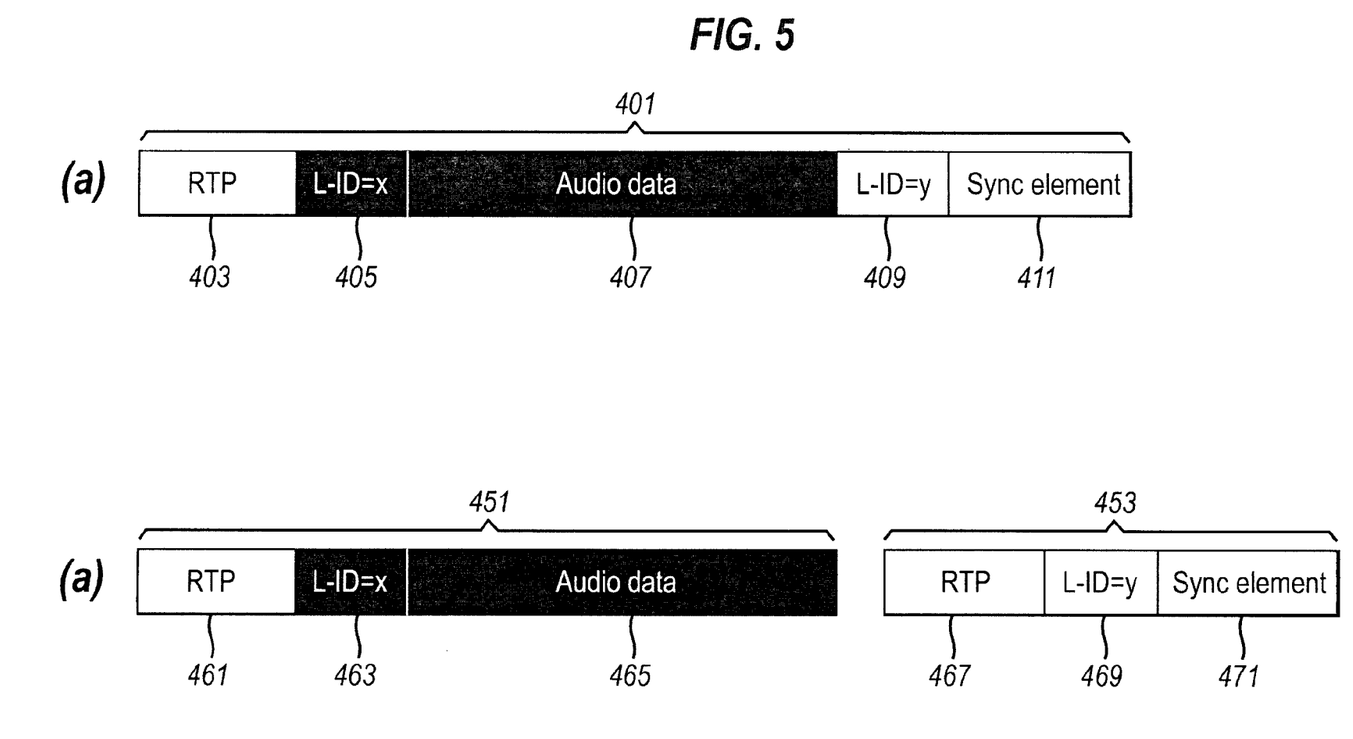
FIG. 5 shows schematically a transport block as used in an embodiment of the invention.
Figure 6:
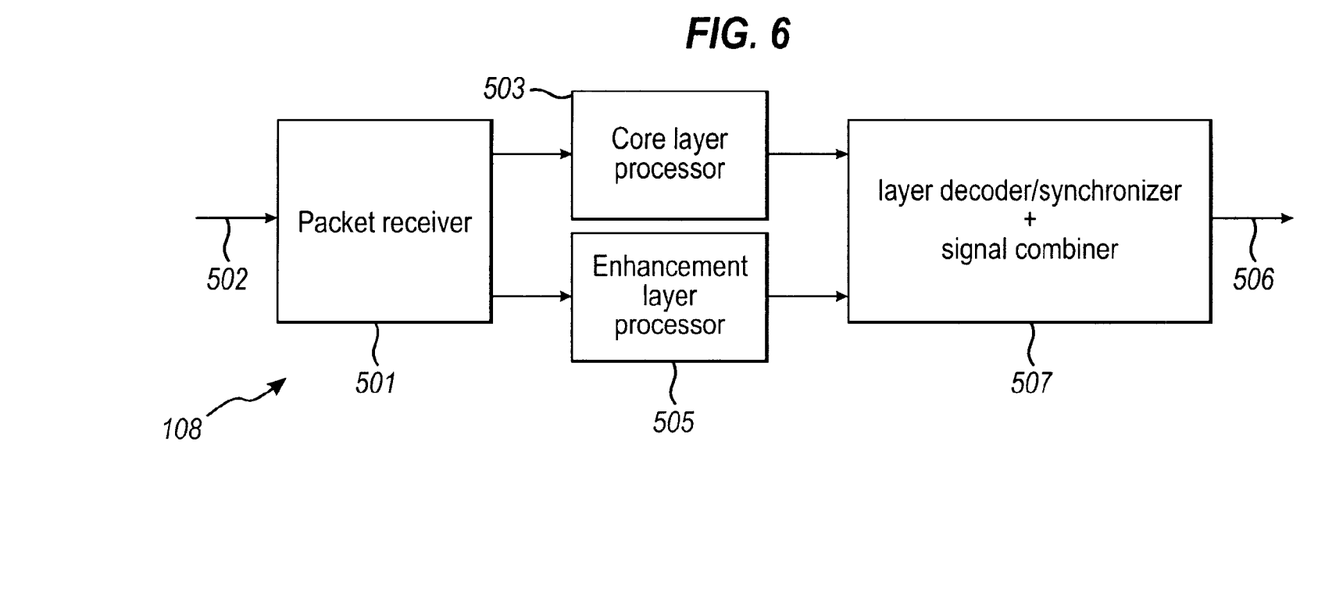
FIG. 6 shows a schematically a decoder part of the audio codec system shown in FIG. 2.
Figure 7:
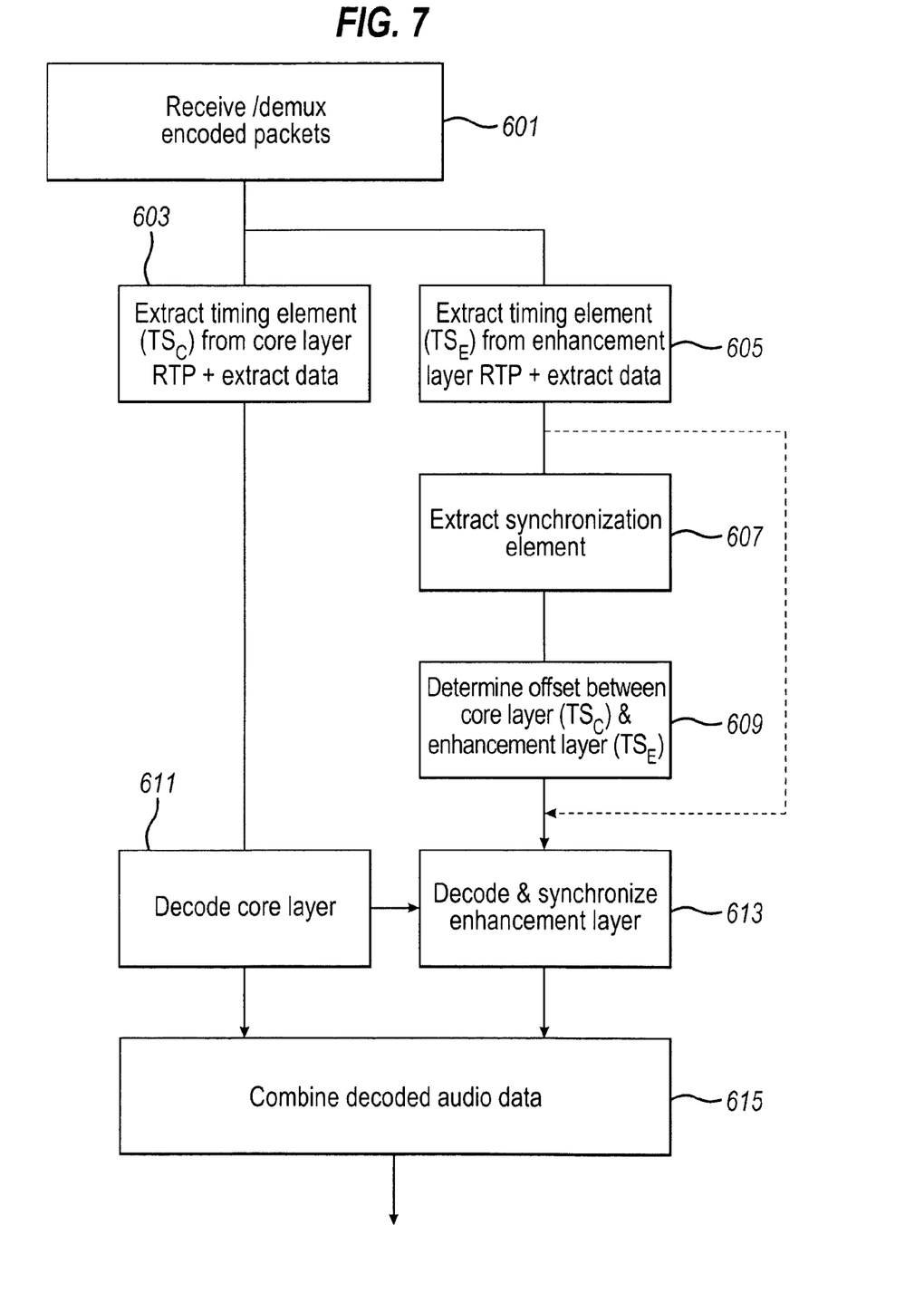
FIG. 7 shows a flow diagram illustrating the operation of an embodiment of the audio decoder as shown in FIG. 6 according to the present invention.

It would be appreciated that the schematic structures described in FIGS. 2, 3, 5 and 6 and the method steps in FIGS. 4 and 7 represent only a part of the operation of a complete audio codec as exemplarily shown implemented in the electronic device shown in FIG. 1.

The general operation of audio codecs as employed by embodiments of the invention is shown in FIG. 2. General audio coding/decoding systems consist of an encoder and a decoder, as illustrated schematically in FIG. 2. Illustrated is a system 102 with an encoder 104, a storage or media channel 106 and a decoder 108.

The encoder 104 compresses an input audio signal 110 producing a bit stream 112, which is either stored or transmitted through a media channel 106. The bit stream 112 can be received within the decoder 108. The decoder 108 decompresses the bit stream 112 and produces an output audio signal 114. The bit rate of the bit stream 112 and the quality of the output audio signal 114 in relation to the input signal 110 are the main features, which define the performance of the coding system 102.

FIG. 3 depicts schematically an encoder 104 according to an exemplary embodiment of the invention. The encoder 104 comprises an input 203 which is arranged to receive an audio signal.

The audio signal input 203 is connected to a layer codec processor 205. The output from the layer codec processor 205 is passed to the core layer RTP session generator 209 and an input of an enhancement layer RTP session generator 211.

The core layer RTP session generator 209 is configured to have one output connected to an input of a network interface 213 and a further output connected to a further input of the enhancement layer RTP session generator 211. The enhancement layer RTP session generator 211 is configured to have an output connected to a further input of the network interface 213.

The network interface 213 may then be arranged to output the output the RTP packet streams 112 via the output 206.

The operation of these components is described in more detail with reference to the flow chart FIG. 4 showing the operation of the encoder 104.

The audio signal is received by the encoder 104. In a first embodiment of the invention the audio signal is a digitally sampled signal. In other embodiments of the present invention the audio input may be an analogue audio signal, for example from a microphone 6, which is analogue to digitally (A/D) converted. In further embodiments of the invention the audio input is converted from a pulse code modulation digital signal to amplitude modulation digital signal. The receiving of the audio signal is shown in FIG. 4 by step 301.

The layer codec processor 205 receives the audio signal to be encoded and outputs the encoded parameters which represent the core level encoded signal. The layer codec processor 205 furthermore generates for internal use the synthesised audio signal (in other words the audio signal is encoded into parameters and then the parameters are decoded using the reciprocal process to produce the synthesised audio signal).

The layer codec processor 205 may use any appropriate encoding technique, to generate the core layer.

In a first embodiment of the invention the layer codec processor 205 generates a core layer using an embedded variable bit rate codec (EV-VBR).

In other embodiments of the invention the core layer may be an algebraic code excited linear prediction encoding (ACELP) and is configured to output a bitstream of typical ACELP parameters.

It is to be understood that embodiments of the present invention could equally use any audio or speech based codec to represent the core layer.

The generation of the core layer coded signal is shown in FIG. 4 by step 303.

The layer codec processor 205 uses the synthesized audio signal (in order words the audio signal is first encoded into parameters such as those described above and then decoded back into an audio signal within the same core layer codec). This synthesized signal is used within the layer codec processor 205 to generate the enhanced layer.

In one embodiment of the invention the synthesized signal and the audio signal are transformed into the frequency domain and the difference between the two frequency domain signals is then encoded to produce the enhancement layer data.

In other embodiments of the invention ITU-T Embedded Variable Bit-Rate (EV-VBR) speech/audio codec enhancement layers and ITU-T Scalable Video Codec (SVC) enhancement layers may be generated.

Further embodiments may include but are not limited to Variable Multi-Rate Wideband (VMR-WB), ITU-T G.729, ITU-T G.729.1, Adaptive Multirate Rate-Wide band (AMR-WB), and Adaptive Multirate Rate-Wideband Plus (AMR-WB+).

In other embodiments of the invention any suitable enhancement layer codec may be employed to extract the correlation between the synthesized signal and the original audio signal to generate an enhanced layer data signal.

The generation of the enhancement data is shown in FIG. 4 by step 305.

The core layer RTP session generator 209 receives the core layer signal data and is configured to generate the RTP session data associated with the core layer signal data. The RTP session data will typically comprise a packet with a header comprising a time stamp value ($TS_C$) which as described above marks a relative time which enables the packets of an RTP session to be reassembled in the correct order when having been received at the receiver.

The generation of the core layer RTP session packet is shown in FIG. 4 by step 307.

The enhancement layer RTP session generator 211 receives the enhancement layer data signal and initially generates an enhancement layer RTP session packet. The enhancement layer RTP packet will also comprise a header comprising a time stamp value ($TS_E$) which marks a relative time with respect to the enhancement layer which would enable the receiver to reconstruct the order of the enhancement layer RTP packets received.

The generation of the enhancement layer RTP session packet is shown in FIG. 4 by step 309.

The enhancement layer RTP session generator furthermore checks whether the current packet being generated is at a synchronization point.

In a first embodiment of the invention the synchronization point is the first packet at the start of the session generation. In other words the enhancement layer RTP session generator determines if this enhancement layer session packet is the first to be transmitted.

In other embodiments of the invention the synchronization point is not only for the first packet at the start of a generated session but for a predetermined number of subsequent packets. In this embodiment the addition of synchronization information on additional packets allows for a larger error rate where one or more packets may not be received, yet the synchronization information may still be received by the receiver.

In a further embodiment of the invention the synchronization point is taken to be every n'th packet. In other words a synchronization point is determined after a predetermined number of packets have been transmitted. For example the synchronization point is determined after every 100 packets. This predetermined number may be chosen dependent on the bit or packet error rate from the transmitter to the receiver.

In further embodiments of the invention the synchronization point is taken to be the packet generated or transmitted after a predetermined regular interval. This predetermined regular interval may be chosen dependent on the bit or packet error rate from the transmitter to the receiver so to optimise the ability of the receiver to receive synchronization information as disclosed below with the overhead requirements by transmitting the synchronization information.

In some embodiments of the information there may be a feedback loop from the decoder/receiver 108 to the encoder/transmitter 104 which is configured to receive a request from the decoder/receiver 108 for synchronization information. On receipt of the request the enhancement layer RTP session generator may be configured to determine that a synchronization point has been reached. The synchronization point may be determined to remain in place following the receipt of the request from the decoder/receiver for a predetermined number of packets.

In some embodiments of the invention the enhancement layer RTP session generator 211 may be configured to determine that a synchronization point has been reached each time the encoder/transmitter 104 needs to introduce a discontinuity in the transmitted stream of packets. For example when the encoder needs to add new enhancement layers based on the media characteristics. For example audio stream switching from mono to stereo is implemented by including an enhancement layer containing stereo bit stream as a separate RTP session. In addition, the available computational resources may vary in the encoding terminal allowing occasionally higher bit rate encoding causing discontinuities. Furthermore Call on-hold functionality creates a discontinuity in encoding.

Furthermore in some embodiments of the invention the enhancement layer RTP session generator 211 may be configured to determine that a synchronization point has been reached each time the transmitted layer configuration is changed to include a higher number of layers.

Furthermore in some embodiments of the invention the enhancement layer RTP session generator 211 may be configured to determine that a synchronization point has been reached each time a talk spurt (in a speech session) is started.

In some embodiments of the invention the enhancement layer RTP session generator 211 may be configured to determine that a synchronization point has been reached each time the session is re-started after a period of inactivity.

The detection of the synchronization point is shown in FIG. 4 by step 311.

If a synchronization point is determined to have been reached then the procedure inserts a synchronization element.

The enhancement layer RTP session generator 211 inserts a synchronization element into the enhancement layer RTP session packet generated in step 309.

In a first embodiment of the invention the enhancement layer RTP session generator 211 inserts in the current enhancement layer RTP session packet, as a synchronization element, the current value of the RTP TS of the RTP session carrying the corresponding core layer data. In other words the value of $TS_C$ is inserted into a packet of the (each) RTP session carrying the enhancement layer data in case a synchronization data needs to be provided for the receiver.

This would enable, as is described below, the decoder/receiver to compute the offset between the core layer RTP TS ($TS_C$) and the RTP TS of each RTP session carrying the enhancement layer data ($TS_E$). Where in embodiments of the invention there are multiple enhancement layers (not shown in FIG. 3), each enhancement layer RTP session generator may insert the core layer RTP TS value associated with the frame of the enhancement layer signal and therefore each session can similarly use the $TS_C$ value to synchronize each layer at the decoder/receiver 108.

In further embodiments of the invention each enhancement layer RTP session generator receives the core layer RTP session TS ($TS_C$) and generates an offset value of the difference between the core layer RTP TS value and enhancement layer RTP TS value in a packet of the (each) RTP session carrying enhancement layer data. The enhancement layer RTP session generator 211 then inserts the TS offset value as the synchronization element into an enhancement layer RTP session packet at each RTP session carrying the layers of the corresponding core layer data.

In yet another embodiment the RTP session generator includes a value of the common timing reference as the synchronization element in a packet of each of the RTP sessions carrying layers of the same media frame. An example of such a common time reference is NTP timestamp, which is carried also in the RTCP sender and receiver reports.

In a further embodiment of the invention the enhancement layer RTP session generator 211 inserts the RTP sequence number (SN) value for the RTP session carrying the core layer data in a packet of the (each) RTP session carrying the enhancement layer data from the same media frame as the synchronization element. This would enable, as described below, the decoder/receiver 108 to find the corresponding RTP TS values and compute the TS offsets required for cross-session synchronization.

In further embodiments of the invention the enhancement layer RTP session generator 211 inserts an identifier, as a synchronization element, with the same value in a packet at each RTP session representing a layer or layers of the same media frame.

In some embodiments of the invention the identifier value may change from layer to layer (from RTP session to RTP session) according to a predetermined pattern.

With respect to FIG. 5, two formats of the RTP packets with inserted synchronization elements may be shown.

As is known in the art the proposed EV-VBR codec RTP payload introduces a concept of transport block, which carries one or several layers from one or several encoded audio frames. Each transport block is independent, consisting of layer identification (L-ID) value indicating the layer configuration carried in the transport block, information on the number of frames included in the transport block, and the actual encoded audio data. Thus, the decoder/receiver 108 may use the L-ID value to uniquely identify the layers that are carried in each of the received transport blocks.

In an embodiment of the invention an L-ID value to indicate a transport block carrying the inserted cross-layer synchronization element instead of encoded audio data is allocated. The transport block carrying the synchronization element may be transmitted together with the transport block(s) carrying the actual EV-VBR audio data.

Thus as can be seen in FIG. 5(a) the RTP session generators 209/211 may output a transport block 401, which according to such an embodiment of the invention comprises a RTP header 403 comprising the RTP header information, a first layer identification value (L-ID=x) 405 which has a value of 'x' indicating the presence of audio data, the audio data 407 for the frame or frames for the layer or layers, a second layer identification value (L-ID=y) 409 which contains an identifier indicating that the synchronization element is enclosed and follows, and the synchronization element 411.

The example in FIG. 5(a) shows in an embodiment where the synchronization element may be transmitted in the same packet with only a single transport block containing audio data. The packet may also contain several transport blocks carrying audio data.

In a further embodiment of the invention the synchronization element is included as part of the data stream but as its own RTP packet. As can be seen in FIG. 5(b), the RTP session generators 209/211 may output a first RTP packet 451 comprising a RTP header 461 comprising the RTP header information, a first layer identification value (L-ID=x) 463 which has a value of 'x' indicating the presence of audio data, and the audio data 465 for the frame or frames for the layer, or layer. The multiplexer 213 also outputs a second related RTP packet 453 comprising a second RTP header 467 comprising the RTP header information, a second layer identification value (L-ID=y) 469 which has a value of 'y', and the synchronization element 471.

In both cases the timing associated with the synchronization element is defined according to the embodiments of the invention by the RTP TS of the packet carrying the cross-layer synchronization element (alternatively, the timing could be specified to be computed from the (RIP) packet header information using a predefined method—e.g. it can be specified to have the same timing as the audio data block preceding/following it).

Typically the amount of information needed for the synchronization element is small compared to the size of the actual media data. However, in case of strict bandwidth limitations, especially in embodiments requiring the inclusion of the synchronization element, only on RTP sessions conveying enhancement layer data it may be possible to completely replace the enhancement layer audio data with the synchronization element in those few frames it is needed. This does not prevent media rendering in the receiver since reception of the core layer audio data ensures successful decoding, although the audio quality may be temporarily degraded.

Furthermore, in all embodiments it is possible to send the synchronization element during inactive source signals, if applicable. For example in embodiments using the EV-VBR codec, the synchronization element may be transmitted during non-speech periods and when it is feasible in the application point of view so to prevent using additional bandwidth during speech periods.

The enhancement layer RTP session generator may then pass the generated enhancement layer RTP packets to the network interface 213.

The network interface 213 on receiving the packets from the core layer RTP session generator 209 and the enhancement layer RTP session generator 211 outputs or stores the RTP packets.

To further assist the understanding of the invention the operation of the decoder 108 with respect to the embodiments of the invention is shown with respect to the decoder schematically shown in FIG. 6 and the flow chart showing the operation of the decoder in FIG. 7.

The decoder comprises an input 502 from which the encoded packet stream 112 may be received. The input 502 is connected to the packet receiver 501.

The packet receiver is configured to forward the received packet stream 112 as at least two separate packet streams. The first packet stream from the receiver is passed to the core layer processor 503.

This unpacking process is shown in FIG. 7 by step 601.

The core layer processor 503 receives the core layer packets and is configured to pass core layer data and a core layer timing element associated with the core layer data to the core layer decoder 507.

The extraction of the timing element $TS_C$ and the core layer data is shown in FIG. 7 by step 603.

The enhancement layer processor 505 receives the enhancement layer packets and is configured to pass enhancement layer data and an enhancement layer timing element $TS_E$ associated with the enhancement layer data to the enhancement layer decoder 509.

The extraction of the timing element $TS_E$ and the enhancement layer data is shown in FIG. 7 by the step 605.

The enhancement layer processor 505 furthermore detects if there is a synchronization element within the enhancement layer packets or associated with the packets.

If there is no synchronization element the method passes to the decoding steps 611/613.

If there is synchronization elements within the enhancement layer packets or associated with the packets then the enhancement layer processor 505 extracts the synchronization element from the layer packets.

The extraction of the synchronization element is shown in FIG. 7 by step 607.

The enhancement layer processor on extracting the synchronization element then determines the offset between the core layer and the enhancement layer.

In the embodiment of the invention as described above where the core layer RTP packet TS $TS_C$ is inserted into the enhancement packet the offset can be determined by a simple subtraction. For example Let us assume we have three RTP sessions, one carrying the core layer data ($RTP_1$) and the two others, one carrying enhancement layer 1 ($RTP_2$) and the second carrying enhancement layer 2 ($RTP_3$). At time t the encoder/transmitter 104 sends the core layer of encoded frame n in $RTP_1$ with the standard timestamp value $TS_{t1}$. To provide the synchronization information for the enhancement layers, a synchronization element containing the corresponding timestamp value in $RTP_1$, i.e. $TS_{t1}$, is included in the payload carrying enhancement layers 1 (in $RTP_2$) and 2 (in $RTP_3$) for encoded frame n. Note that these packets themselves will have standard RTP timestamp values $TS_{t2}$ and $TS_{t3}$ in their RTP headers, respectively.

On receiving the synchronization element(s) the decoder/receiver 108 can now find all the enhancement layers that correspond to any given core layer data by comparing the RTP TS of the core layer data and the synchronisation information consisting of a core layer time stamp transmitted within the enhancement layer payloads. Most importantly, the decoder/receiver 108 can determine the offset between the core layer TS and the enhancement layer 1 TS by $TS_{o2}=TS_{t1}-TS_{t2}$. This would provide the required information for the cross-layer synchronization: the enhancement layer 1 for encoded frame n has the timestamp $TS_{t2}$, and the core layer for the same encoded frame has the timestamp value $TS_{t2}+TS_{o2}$. Or in other words, any subsequent timestamp of the $RTP_2$ can be brought to the $RTP_1$ timeline by adding $TS_{o2}$ to the TS value received in the RTP header of an $RTP_2$ packet.

In a similar manner the offset between the core layer TS and the enhancement layer 2 TS can by computed by $TS_{o3}=TS_{t1}-TS_{t3}$, and subsequent timestamps are transformed to match the $RTP_1$ timestamps by adding $TS_{o3}$.

Similarly the offset may be determined by examining the synchronization elements in other embodiments of the invention, such as reading the offset value, or by comparing the received sequence number in the synchronization elements with the sequence number of the received core layer packet, or by comparing the identifier on the enhancement layer packet with the core layer packet.

The determination of the offset is shown in FIG. 7 by step 609.

The layer decoder 507 performs the complementary operation to that performed by the core layer codec processor 205 on the core layer data to generate a synthetic audio signal for the core layer. Furthermore the core layer synthetic signal is used internally to generate the enhancement layer(s).

The decoding of the core layer is shown in FIG. 7 by step 611.

The layer decoder 507 furthermore performs the complementary operation to that performed by the layer codec processor 205 to generate a synthetic enhancement layer signal.

In embodiments of the invention where the decoding of the synthetic enhancement layer signal requires data from the synthetic core layer signal the enhancement layer signal from the enhancement layer processor is synchronized using the offset information passed from the enhancement layer processor.

The synchronizing and decoding of the enhanced layer is shown in FIG. 7 by step 613.

The synthetic enhancement layer signal is then combined together with the synthetic core layer signal to generate the synthetic audio signal on the output 506.

In some embodiments of the invention which do not share common time critical data relating to the decoding process the synchronization of the synthetic signals may be carried out using the offset information after the decoding of the enhancement layer.

It is to be understood that even though the present invention has been exemplary described in terms of a core layer and single enhancement layer, it is to be understood that the present invention may be applied to further enhancement layers.

The embodiments of the invention described above describe the codec in terms of separate encoders 104 and decoders 108 apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some/or all common elements.

As mentioned previously although the above process describes a single core audio encoded signal and a single enhancement layer audio encoded signal the same approach may be applied to synchronize and two media streams using the same or similar packet transmission protocols.

Although the above examples describe embodiments of the invention operating within a codec within an electronic device 610, it would be appreciated that the invention as described below may be implemented as part of any variable rate/adaptive rate audio (or speech) codec. Thus, for example, embodiments of the invention may be implemented in an audio codec which may implement audio coding over fixed or wired communication paths.

Thus user equipment may comprise an audio codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one processor; and
   at least one memory including computer program code, the at least one memory, the at least one processor, and the computer program code configured to cause the apparatus to at least:
   generate packets from an input signal;
   generate at least one core layer encoded signal, based at least in part on the input signal, the core layer encoded signal comprising a first relative time value;
   generate at least one enhancement layer signal, based at least in part on the input signal and associated with the at least one core layer encoded signal;
   generate at least one indicator associated with each of the at least one enhancement layer signal, each of the at least one indicator based at least in part on the first relative time value; and
   determine if a synchronization point has been reached,
   wherein the at least one indicator comprises an identifier identifying the at least one core layer encoded signal, and
   wherein the at least one indicator is generated only if the synchronization point has been reached.

2. The apparatus of claim 1, wherein the first relative time value comprises a real-time transport protocol time stamp, and
   wherein the identifier comprises the real-time transport protocol time stamp of the at least one core layer encoded signal.

3. The apparatus of claim 1, wherein each of the at least one enhancement layer signal comprises an associated second relative time value, and
   wherein the at least one indicator comprises a difference between the first relative time value and the associated second relative time value.

4. The apparatus of claim 1, wherein the at least one core layer encoded signal further comprises:
   a sequence number, wherein each of the at least one indicator comprises the sequence number, and
   a first identifier value based at least in part on the first relative time value.

5. The apparatus of claim 4, wherein each of the at least one indicator comprises the first identifier value.

6. The apparatus of claim 4, wherein each of the at least one indicator comprises at least one second identifier value, the at least one second identifier value being based at least in part on the first identifier value and the at least one enhancement layer signal.

7. The apparatus of claim 1, wherein the synchronization point is determined based at least in part on receiving a synchronization request.

8. The apparatus of claim 1, wherein the at least one core layer encoded signal comprises a plurality of packets,
   wherein the synchronization point is determined based at least in part on detecting any of a predetermined number of packets, and
   wherein the predetermined number of packets comprise at least one of:
   a first predetermined number of packets of the plurality of packets;
   at least one of the predetermined number of packets separated from a second of the predetermined number of packets by a second predetermined number of packets; and
   at least one of the predetermined number of packets separated from a second of the predetermined number of packets by a predetermined time period.

9. The apparatus of claim 1, wherein the at least one core layer encoded signal comprises a plurality of packets, and
   wherein the synchronization point is determined based at least in part on detecting one of the following:
   a discontinuity in a stream of packets;
   a changing of a configuration of at least one of the core layer encoded signal and at least one of the enhancement layer signal; and
   a talk spurt or a restarting of a session.

10. An apparatus comprising:
    at least one processor; and
    at least one memory including computer program code, the at least one memory, the at least one processor, and the computer program code configured to cause the apparatus to at least:
    receive an encoded signal comprising at least one core layer encoded signal, at least one enhancement layer encoded signal, and at least one indicator, the at least one core layer encoded signal comprising a first relative time value, the at least one enhancement layer encoded signal comprising a second relative time value, and the at least one indicator associated with each of the at least one enhancement layer encoded signal;

synchronize each of the at least one enhancement layer encoded signal with at least one of the at least one core layer encoded signal based at least in part on the associated at least one indicator first relative time value; and decode each of the at least one enhancement layer encoded signal synchronized with the at least one core layer encoded signal to generate a decoded signal, wherein the at least one indicator comprises an identifier identifying one of the at least one core layer encoded signal, and wherein the at least one indicator comprises a difference between the first relative time value and the second relative time value.

11. The apparatus of claim 10, wherein each first relative time value comprises a first time stamp value, and wherein the at least one indicator comprises the first time stamp value for one of the at least one core layer encoded signal associated with one of the at least one enhancement layer encoded signal.

12. The apparatus of claim 11, wherein each second relative time value comprises a second time stamp value, and wherein the apparatus is further configured to determine a time offset value between the first time stamp value and the second time stamp value of the associated one of the at least one enhancement layer encoded signal.

13. The apparatus of claim 10, wherein the at least one core layer encoded signal further comprises a sequence number, and wherein each of the at least one indicator comprises the sequence number of the associated at least one core layer encoded signal.

14. The apparatus of claim 10, wherein the at least one core layer encoded signal further comprises a first identifier value based at least in part on the first relative time value, wherein each of the at least one indicator comprises the first identifier value, and wherein each of the at least one indicator comprises at least one second identifier value, the second identifier value being based at least in part on the first identifier value and the at least one enhancement layer encoded signal.

15. A method comprising:

generating, by at least one processor, packets from an input signal;

generating, by the at least one processor, at least one core layer encoded signal, based at least in part on the input signal, the core layer encoded signal comprising a first relative time value;

generating, by the at least one processor, at least one enhancement layer signal, based at least in part on the input signal and associated with the at least one core layer encoded signal;

generating, by the at least one processor, at least one indicator associated with each of the at least one enhancement layer signal, each of the at least one indicator based at least in part on the first relative time value; and determining, by the at least one processor, if a synchronization point has been reached, wherein the at least one indicator comprises an identifier identifying the at least one core layer encoded signal, and wherein the at least one indicator is generated only if the synchronization point has been reached.

16. The method of claim 15, wherein the first relative time value comprises a real-time transport protocol time stamp, and wherein the identifier comprises the real-time transport protocol time stamp of the at least one core layer encoded signal.

17. The method of claim 15, wherein each of the at least one enhancement layer signal comprises an associated second relative time value, and wherein the at least one indicator comprises a difference between the first relative time value and the associated second relative time value.

18. The method of claim 15, wherein the at least one core layer encoded signal further comprises:

a sequence number, wherein each of the at least one indicator comprises the sequence number; and a first identifier value based at least in part on the first relative time value.

19. The method of claim 18, wherein each of the at least one indicator comprises the first identifier value.

20. The method of claim 18, wherein each of the at least one indicator comprises at least one second identifier value, the at least one second identifier value being based at least in part on the first identifier value and the at least one enhancement layer signal.

21. The method of claim 15, wherein the synchronization point is determined based at least in part on receiving a synchronization request.

22. The method of claim 15, wherein the at least one core layer encoded signal comprises a plurality of packets, wherein the synchronization point is determined based at least in part on detecting any of a predetermined number of packets, and wherein the predetermined number of packets comprise at least one of:

a first predetermined number of packets of the plurality of packets;

at least one of the predetermined number of packets separated from a second of the predetermined number of packets by a second predetermined number of packets; and at least one of the predetermined number of packets separated from a second of the predetermined number of packets by a predetermined time period.

23. The method of claim 15, wherein the at least one core layer encoded signal comprises a plurality of packets, and wherein the synchronization point is determined based at least in part on detecting one of the following:

a discontinuity in a stream of packets;

a changing of a configuration of at least one of the core layer encoded signal and at least one of the enhancement layer signal; and a talk spurt or a restarting of a session.

24. A method comprising:

receiving, by at least one processor, an encoded signal comprising at least one core layer encoded signal, at least one enhancement layer encoded signal, and at least one indicator, the at least one core layer encoded signal comprising a first relative time value, the at least one enhancement layer encoded signal comprising a second relative time value, and the at least one indicator associated with each of the at least one enhancement layer encoded signal;

synchronizing, by the at least one processor, each of the at least one enhancement layer encoded signal with at least one of the at least one core layer encoded signal based at least in part on the associated at least one indicator first relative time value; and decoding, by the at least one processor, each of the at least one enhancement layer encoded signal synchronized with the at least one core layer encoded signal to generate a decoded signal, wherein the at least one indicator comprises an identifier identifying one of the at least one core layer encoded signal, and wherein the at least one indicator comprises a difference between the first relative time value and the second relative time value.

25. The method of claim 24, wherein each first relative time value comprises a first time stamp value, and wherein the at least one indicator comprises the first time stamp value for one of the at least one core layer encoded signal associated with one of the at least one enhancement layer encoded signal.

26. The method of claim 25, wherein each second relative time value comprises a second time stamp value, and wherein the method further comprises determining a time offset value between the first time stamp value and the second time stamp value of the associated one of the at least one enhancement layer encoded signal.

27. The method of claim 24, wherein the at least one core layer encoded signal further comprises a sequence number, and wherein each of the at least one indicator comprises the sequence number of the associated at least one core layer encoded signal.

28. The method of claim 24, wherein the at least one core layer encoded signal further comprises a first identifier value based at least in part on the first relative time value, wherein each of the at least one indicator comprises the first identifier value, and wherein each of the at least one indicator comprises at least one second identifier value, the second identifier value being based at least in part on the first identifier value and the at least one enhancement layer encoded signal.

29. A computer program product comprising a non-transitory computer-readable medium encoded with instructions that, when executed by at least one processor, perform at least the following:

generating packets from an input signal;

generating at least one core layer encoded signal, based at least in part on the input signal, the core layer encoded signal comprising a first relative time value;

generating at least one enhancement layer signal, based at least in part on the input signal and associated with the at least one core layer encoded signal;

generating at least one indicator associated with each of the at least one enhancement layer signal, each of the at least one indicator based at least in part on the first relative time value; and determining if a synchronization point has been reached, wherein the at least one indicator comprises an identifier identifying the at least one core layer encoded signal, and wherein the at least one indicator is generated only if the synchronization point has been reached.

30. A computer program product comprising a non-transitory computer-readable medium encoded with instructions that, when executed by at least one processor, perform at least the following:

receiving an encoded signal comprising at least one core layer encoded signal, at least one enhancement layer encoded signal, and at least one indicator, the at least one core layer encoded signal comprising a first relative time value, the at least one enhancement layer encoded signal comprising a second relative time value, and the at least one indicator associated with each of the at least one enhancement layer encoded signal;

synchronizing each of the at least one enhancement layer encoded signal with at least one of the at least one core layer encoded signal based at least in part on the associated at least one indicator first relative time value; and decoding each of the at least one enhancement layer encoded signal synchronized with the at least one core layer encoded signal to generate a decoded signal, wherein the at least one indicator comprises an identifier identifying one of the at least one core layer encoded signal, and wherein the at least one indicator comprises a difference between the first relative time value and the second relative time value.

* * * * *